United States Patent [19]

Jones et al.

[11] Patent Number: 4,503,378
[45] Date of Patent: Mar. 5, 1985

[54] CHARGING SYSTEM FOR NICKEL-ZINC BATTERIES

[75] Inventors: Richard A. Jones, Anderson; William D. Reoch, Middletown, both of Ind.

[73] Assignee: General Motors Corporation, Detroit, Mich.

[21] Appl. No.: 490,425

[22] Filed: May 2, 1983

[51] Int. Cl.³ .................... H02J 7/04; H01M 10/44
[52] U.S. Cl. ....................... 320/20; 320/39; 320/40
[58] Field of Search ............... 320/2, 3, 20, 21, 39, 320/40

[56] References Cited

U.S. PATENT DOCUMENTS

| | | | |
|---|---|---|---|
| 3,289,065 | 11/1966 | Dehmelt et al. | 320/40 |
| 3,424,969 | 1/1969 | Barry | 320/21 |
| 3,660,748 | 5/1972 | Clayton | 320/39 |
| 3,938,021 | 2/1976 | Kosmin | 320/40 |
| 3,979,658 | 9/1976 | Foster | 320/23 |
| 3,992,658 | 11/1976 | Bechtold et al. | 320/20 |
| 4,134,056 | 1/1979 | Fukui et al. | 320/20 |
| 4,136,310 | 1/1979 | Foster | 320/37 |
| 4,137,493 | 1/1979 | Smith | 320/39 |
| 4,146,830 | 3/1979 | Foster | 320/23 |
| 4,163,933 | 8/1979 | Foster | 320/20 |
| 4,163,934 | 8/1979 | Lawn | 320/23 |
| 4,191,918 | 5/1980 | Nicholls | 320/23 |
| 4,213,080 | 7/1980 | Rock | 320/21 |
| 4,392,101 | 7/1983 | Saar et al. | 320/20 |

Primary Examiner—R. J. Hickey
Attorney, Agent, or Firm—Mark A. Navarre

[57] ABSTRACT

A source of constant current or constant power supplies charging current to a nickel-zinc battery to produce a generally S-shaped battery voltage waveform. To improve battery life, charging is terminated at the inflection point where the slope of the battery voltage changes from increasing to decreasing.

3 Claims, 5 Drawing Figures

CHARGING SYSTEM FOR NICKEL-ZINC BATTERIES

This invention relates to a method and apparatus for charging a nickel-zinc battery pack, such as might be used to power the traction motor of an electric vehicle. More particularly, this invention relates to a method and apparatus for terminating charging such that battery life is improved.

In general, the term "battery" refers to one or more galvanic cells which, upon discharge, supply direct current to a load device. When discharged, the cells may be recharged by passing direct current of the opposite polarity therethrough. Charge/discharge cycling causes gradual deterioration of the battery and there is a practical limit to the number of times that any given battery may be cycled. The practical limit of charge/discharge cycling determines the battery's life and is most often defined in terms of the number of charge/discharge cycles that the battery can endure before its performance degrades to a predetermined level under a given set of test conditions.

It is known that charging and discharging methods affect battery life. For example, it is generally known that severe overcharging can consume battery electrolyte and degrade the active material of the battery. On the other hand, undercharging can result in a cell-to-cell charge imbalance that can damage the lesser charged cells. Accordingly, various charging algorithms have been developed for increasing battery life.

It is also known that chemically diverse batteries generally have diverse charging requirements. What is good for one type of battery may not be good for another type of battery.

This invention relates to a charging method for nickel-zinc or like batteries. Through empirical investigation and testing, we have arrived at a method of charging nickel-zinc or like batteries that may be practicably implemented and that yields substantially optimum battery life. According to this invention, the battery is supplied with charging current such that a characteristic charging voltage waveform is repeatedly produced, and the charging cycle is terminated when an identifiable point on such voltage waveform is detected. More particularly, a source of constant current or constant power is connected to supply charging current to the battery and the resulting characteristic battery voltage waveform has an "S" shaped appearance with respect to time that begins at a relatively low voltage, that increases to a maximum voltage and then declines. After an initial transient period, the slope of the voltage waveform begins to increase. At some point, the voltage slope ceases to increase and begins to decrease, the voltage slope being equal to zero at the maximum voltage value. Battery charging is terminated at the inflection point where the slope of the voltage waveform ceases to increase and begins to decrease. Put another way, charging is terminated when the second derivative with respect to time of the voltage waveform passes through zero.

When a nickel-zinc or like battery is charged in the manner described above, the optimum or substantially optimum battery life is attained. Further, the method may be practicably implemented with conventional electronic circuitry and is repeatable regardless of the battery age, temperature or state of charge.

IN THE DRAWINGS

FIG. 1 is a schematic diagram of a microcomputer based system for implementing the battery charging system of this invention.

FIG. 2 depicts various idealized battery voltage related waveforms on a common time base for a typical battery charging cycle. Graph A shows the battery voltage; Graph B shows the slope or the first derivative with respect to time of the battery voltage; and Graph C shows the second derivative with respect to time of the battery voltage.

Figure 2:
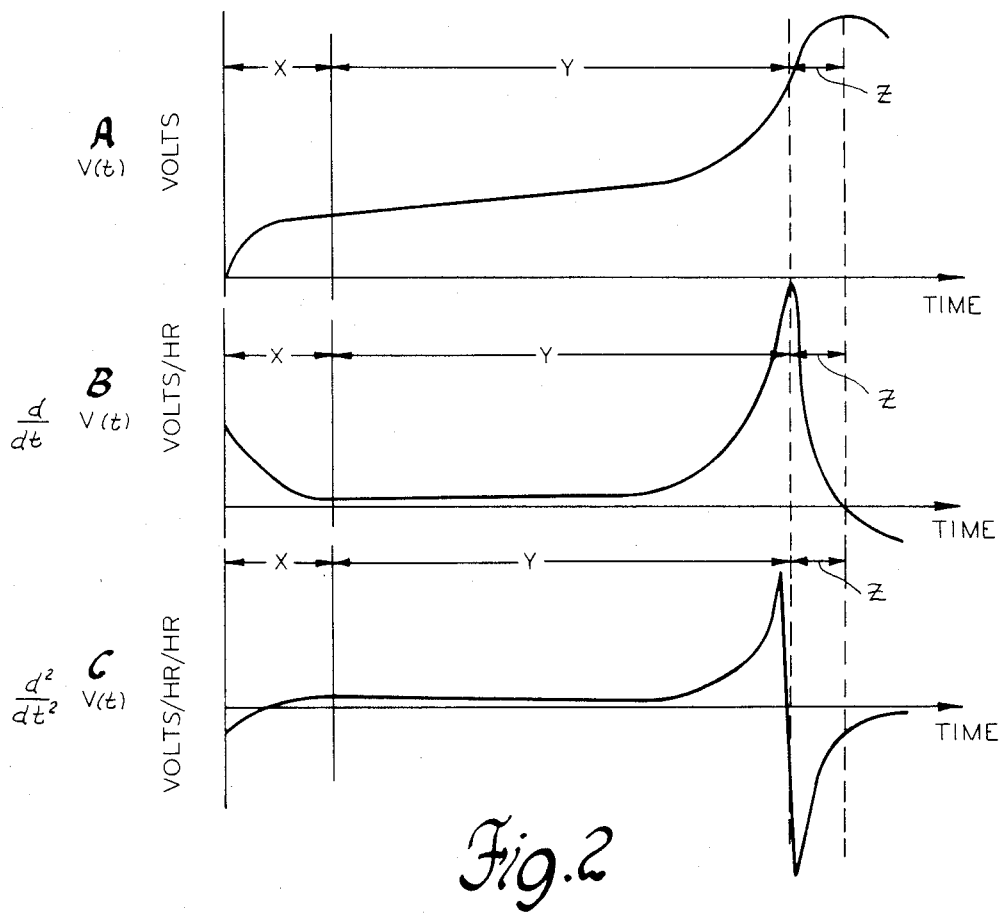

Referring now more particularly to FIG. 2, Graph A is an idealized waveform of the terminal voltage of a nickel-zinc battery when charged with a constant power or constant current power supply. Graphs B and C are derived from Graph A; Graph B depicts the slope or first derivative with respect to time of the battery voltage waveform ($dV(t)/dt$) and Graph C depicts the second derivative with respect to time of the battery voltage waveform ($d^2V(t)/dt^2$). The waveforms are divided into three distinct portions on the time axis, such portions being designated as X, Y and Z. The waveform portion designated by X represents the portion of the charge cycle commencing when the power supply is initially connected across the battery and ending when the slope of the battery voltage begins to increase. The waveform portion designated by Y is a period of increasing battery voltage slope which terminates when the voltage slope ceases to increase and begins to decrease. The termination of the Y portion is identifiable as the maximum value of the first derivative waveform (Graph B) and as the zero crossing of the second derivative waveform (Graph C). The waveform portion designated by Z commences when the voltage slope changes from positive to negative and terminates when the battery voltage attains its maximum value. The termination of the Z portion is also identifiable as the zero crossing of the first derivative waveform in Graph B. Beyond the Z portion of the waveforms, the battery voltage actually decreases.

In battery charging systems, it is generally recognized that overcharging is detrimental to battery life. Accordingly, it has been suggested that the charging cycle should be terminated when the battery voltage reaches its peak value—at the end of the waveform portion designated by the letter Z in FIG. 2. We have empirically determined, however, that, at least respecting nickel-zinc batteries, that the battery life may be significantly improved by terminating the charging cycle when the slope changes from positive to negative rather than waiting until the voltage attains its maximum value. That point corresponds to the end of the waveform portion designated by the letter Y in FIG. 2 and is identifiable as the maximum value of the first derivative or slope curve (Graph B) or as the zero crossing of the second derivative curve (Graph C).

Figure 1:
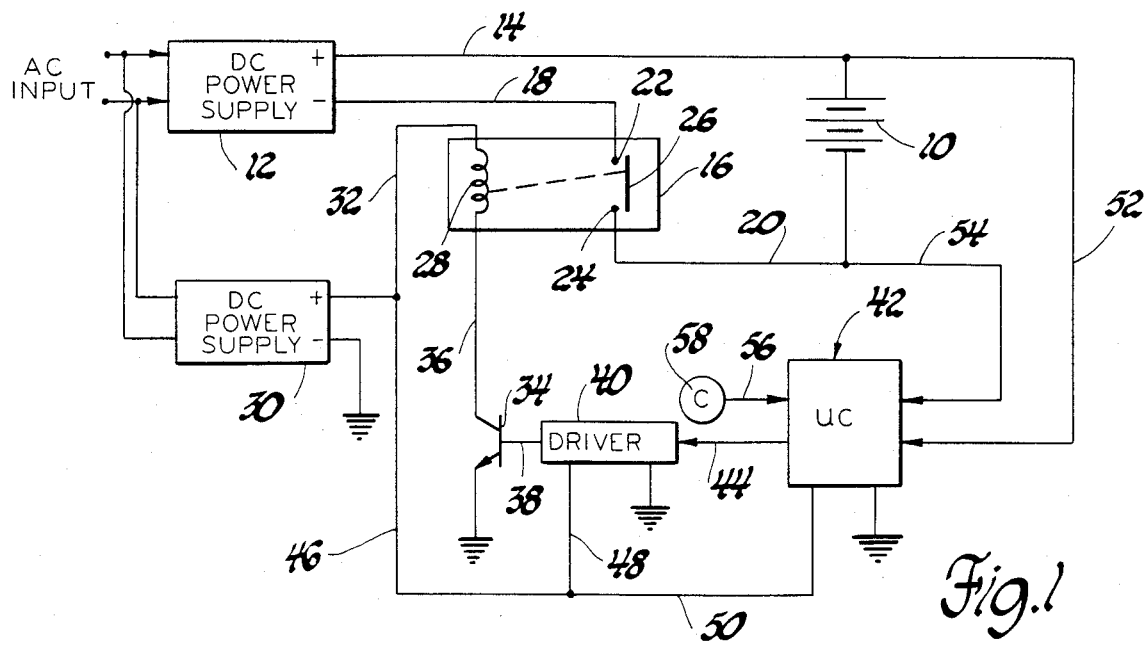

FIG. 1 depicts a microcomputer based control system for implementing the battery charging system of this invention. Reference numeral 10 designates a multi-cell nickel-zinc battery and reference numeral 12 designates a DC power supply which is adapted to provide a constant current or constant power DC output. DC power supplies meeting the above requirements are readily attainable, one such being a Sorenson DCR20-50B, which is operated from an alternating current input as shown in FIG. 1. The positive output of the DC power supply 12 is connected directly to the positive terminal of battery 10 via line 14, and the negative output of power supply 12 is connected through relay 16 via lines 18 and 20 to the negative terminal of battery 10. Line 18 connects the negative terminal of DC power supply 12 to relay contact 22 and line 20 connects negative terminal of battery 10 to relay contact 24. Relay switch arm 26 is normally biased to an open position as shown in FIG. 1 by a spring or other resilient member (not shown) and relay winding 28 is energizable to move relay switch arm 26 to a closed position connecting relay contacts 22 and 24. Thus, when relay winding 28 is de-energized, DC power supply 12 is effectively disconnected from battery 10 and when relay winding 28 is energized, DC power supply 12 is connected to charge battery 10.

A second DC power supply designated by reference numeral 30, operates from an alternating current input as shown and provides a DC voltage at its positive output for supplying power to the remainder of the circuit. The negative output of power supply 30 is connected to ground potential.

One terminal of relay winding 28 is connected via line 32 to the positive output of power supply 30 and the other terminal of relay winding 28 is connected to the collector of power transistor 34 via line 36. The emitter of power transistor 34 is connected to ground potential and its base is connected via line 38 to transistor driver circuit 40 which controls the conduction of power transistor 34 in accordance with an output from microcomputer 42 on output line 44. When transistor 34 is biased to its conductive state, relay winding 28 is energized to connect DC power supply 12 to battery 10 and when the power transistor 34 is biased to its nonconductive state, relay winding 28 is de-energized to disconnect DC power supply 12 from battery 10. Transistor driver 40 receives power from DC power supply 30 via lines 46 and 48 and is adapted to amplify low level signals on output line 44 for controlling the conduction of power transistor 34 via line 38.

Microcomputer 42 receives its power from power supply 30 via lines 46 and 50 and is adapted to receive an input signal representative of the voltage of battery 10 via lines 52 and 54 which connect the positive and negative terminals of battery 10 to one of the microcomputer analog input ports. A clock oscillator 58 supplies high frequency clock pulses to the clock input of microcomputer 42 via line 56 for controlling the internal timing of microcomputer 42. In operation, microcomputer 42 executes program instructions represented by the flow diagrams of FIGS. 4 and 5 herein and in response thereto controls the conduction of power transistor 34 via a low level discrete output on output line 44. A number of commercially available devices may be used to implement the functions of microcomputer 42, one such being the MC6809 microcomputer manufactured by Motorola Semiconductor Products, Inc., Austin, Tex. The device referred to above is a single integrated circuit which includes internal memory, input/output ports, a timer, and an analog-to-digital converter.

Figure 4:
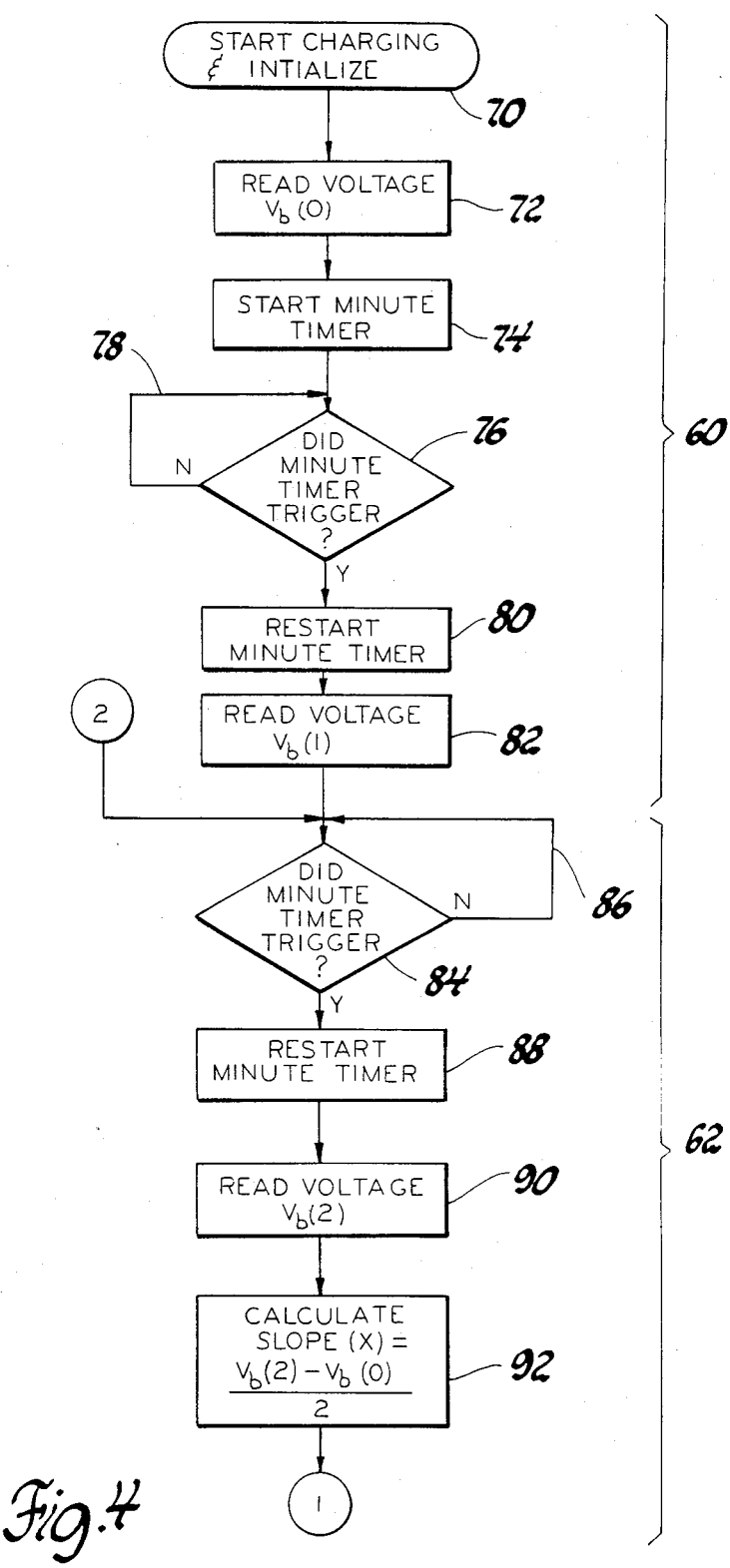
FIGS. 4 and 5 depict flow diagrams for implementing the battery charging system of this invention with the microcomputer based system depicted in FIG. 1.
Figure 5:
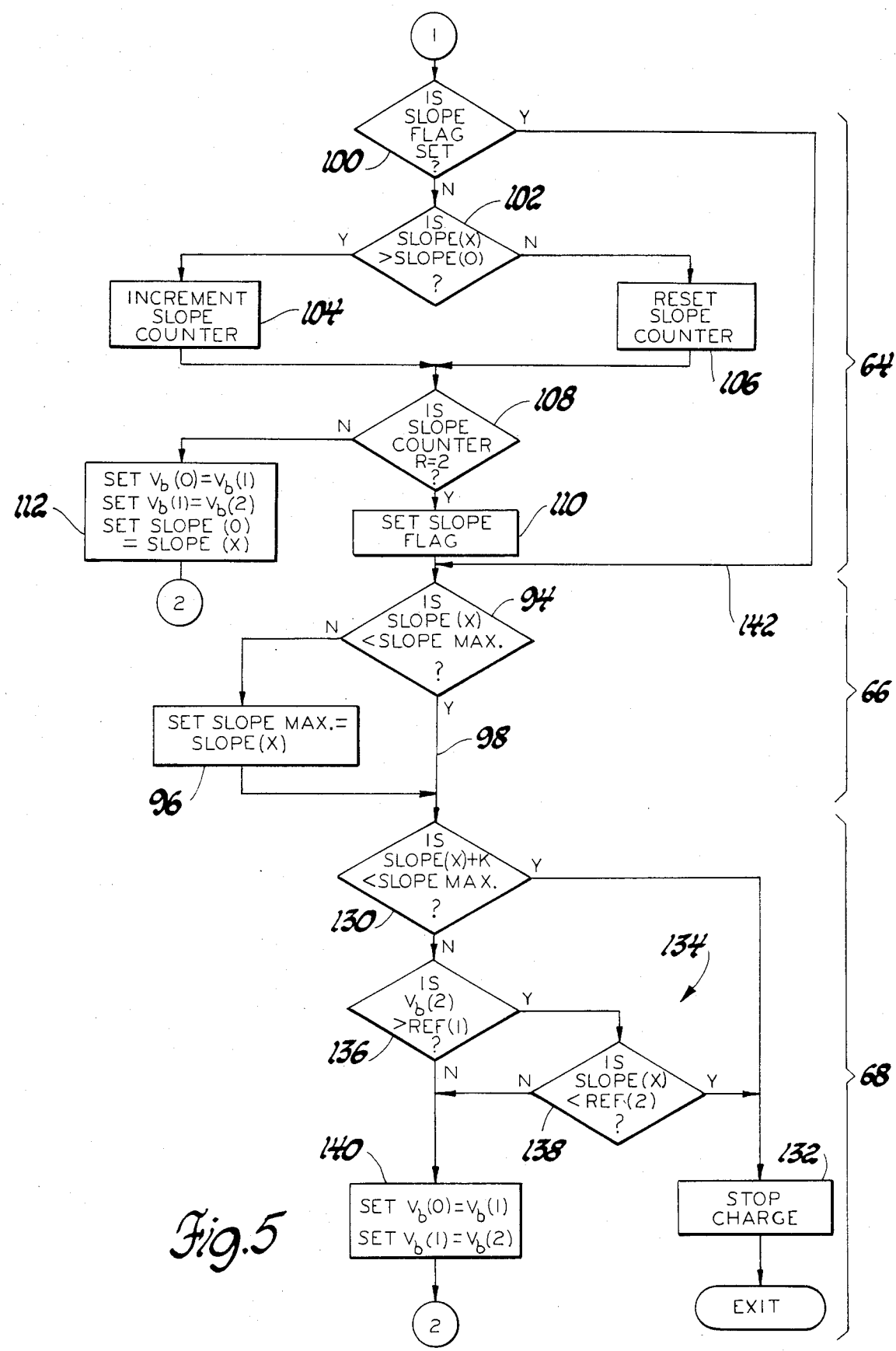

As will be well-known to those skilled in the art, the flow diagrams depicted in FIGS. 4 and 5 represent program instructions suitable for execution by microcomputer 42 shown in FIG. 1.

Referring now more particularly to FIGS. 4 and 5, the flow diagram depicted therein may be conceptually divided into five portions. A first portion, designated by the reference numeral 60, serves to start the charging cycle and to initialize various memory registers and variables. As such, it is executed only once during each charging cycle. A second portion of the flow diagram, designated by the reference numeral 62, serves to read new battery voltage values at one minute intervals and to update the battery voltage slope. A third portion of the flow diagram, designated by the reference numeral 64, serves to determine when the transient portion of the voltage waveform—the portion designated by the letter X in FIG. 2—is terminated. A fourth portion of the flow diagram designated by the reference numeral 66, serves to compare recently determined slope values with previously determined slope values to identify and store the maximum slope value (SLOPE MAX) during the charging cycle. A fifth portion of the flow diagram, designated by the reference numeral 68, serves to identify the maximum voltage slope—the end of the voltage waveform portion designated by the letter Y in FIG. 2.

Referring now more particularly to flow diagram portion 60, reference numeral 70 represents a series of program instructions for starting the charging cycle and for initializing various program registers and variables such as SLOPE MAX to zero. A first battery voltage reading, designated $V_b(0)$, is then taken as shown at instruction block 72. Then a timer internal to microcomputer 42, which is controlled to time a period of one minute and which is designated as a minute timer, is started as indicated at instruction block 74. At instruction block 76, it is determined whether the minute timer has triggered—that is, whether one minute has elapsed. If not, further execution of the flow diagram is halted as indicated by flow diagram line 78. If so, the minute timer is restarted as indicated at instruction block 80 and a second voltage reading $V_b(1)$ is taken as indicated at instruction block 82.

In flow diagram portion 62, it is first determined if the minute timer has triggered as indicated at instruction block 84. If not, further execution of the flow diagram is halted as indicated by flow diagram line 86. If so, the minute timer is restarted as indicated by instruction block 88 and a third voltage reading $V_b(2)$ is taken as indicated at instruction block 90. Thus far, three battery voltage readings $V_b(0)$, $V_b(1)$ and $V_b(2)$—have been taken at intervals of one minute. Instruction block 92 then determines the battery voltage slope, SLOPE (X), over a two minute period between the voltage readings $V_b(0)$ and $V_b(2)$.

Flow diagram portion 64 begins in FIG. 5, as indicated by the circled numeral 1 connector. As noted above, the termination of the transient or X portion of the voltage waveform is characterized as a period of increasing battery voltage slope. Accordingly, flow diagram portion 66 compares each slope value, SLOPE (X), with the previously determined slope value SLOPE (0) and indicates when the voltage slope has increased two times in succession. A memory location or register designated as the SLOPE FLAG is used to indicate whether the battery voltage is in the transient portion of the waveform as designated by the letter X in FIG. 2 or in the increasing slope portion of the waveform as designated by the letter Y in FIG. 2. Initially, the SLOPE FLAG is reset to zero as noted above in reference to instruction block 70, indicating that the battery voltage is in the transient or X portion of the waveform.

Instruction block 100 determines if the SLOPE FLAG is set. If not, the battery voltage is in the transient or X portion of the voltage waveform and instruction block 102 determines if the most recently determined slope, SLOPE (X) is greater than the previously determined slope, SLOPE (0). Initially, the value of SLOPE (0) is reset to zero as indicated in reference to instruction block 70. If SLOPE (X) is greater than SLOPE (0), instruction block 104 is executed to increment the value of a memory register designated as SLOPE COUNTER. Initially, the value of SLOPE COUNTER is set to zero as indicated in reference to instruction block 70. If SLOPE (X) is less than or equal to SLOPE (0), instruction block 106 is executed to reset the SLOPE COUNTER register to zero. Instruction block 108 determines if the value in the register SLOPE COUNTER is equal to two. If so, the transient or X portion of the voltage waveform is over and instruction block 110 is executed to set the SLOPE FLAG. If the value of the register SLOPE COUNTER is less than two, the battery voltage is still in the transient or X portion of the voltage waveform and instruction block 112 is executed to update the values of the variables $V_b(0)$, $V_b(1)$ and SLOPE (0). Specifically, the oldest voltage reading $V_b(0)$ is discarded and made equal to the second oldest reading $V_b(1)$. Likewise, the variable $V_b(1)$ is made equal to the voltage reading formerly designated $V_b(2)$. Also, the variable SLOPE (0) is made equal to the most recently determined slope value, SLOPE (X). Then, as indicated by the circled numeral 2 connector, flow diagram portion 62 is re-executed to take another voltage readin $V_b(2)$ when the minute counter triggers. Due to the execution of instruction blocks 112 and 90, the oldest voltage reading $V_b(0)$ is discarded and a new voltage reading $V_b(2)$ is taken. Instruction block 92 is then executed to determine a new slope value, SLOPE (X). The flow diagram portion 64 is then re-executed to determine if the most recently determined slope value, SLOPE (X), is greater than the previously determined slope value, SLOPE (0).

Once it is determined that the transient or X portion of the voltage waveform is over—that the battery voltage slope has increased two times consecutively—the flow diagram portion 66 is executed. In flow diagram portion 66, the most recently determined slope value SLOPE (X), is compared with the variable SLOPE MAX as indicated at instruction block 94. Initially, the value of the variable SLOPE MAX is set to zero, as noted above in reference to instruction block 70. If the most recently determined slope is greater than or equal to the variable SLOPE MAX, the value of SLOPE MAX, is updated and made equal to the most recent slope value, as indicated at instruction block 96. If the most recently determined slope value is less than SLOPE MAX, execution of instruction block 96 is skipped as indicated by flow diagram line 98. Thus, the value of the variable SLOPE MAX is updated if necessary each time flow diagram portion 66 is executed so as to store the highest battery voltage slope occurring in the Y portion of the charging cycle. The end of the battery voltage waveform portion designated by the letter Y in FIG. 2 is identified as the point where, after a period of increasing slope, the most recently determined slope value begins to decrease—that is, the maximum slope value. Put another way, the termination point is identified as the point where the second derivative with respect to time of the battery voltage crosses through zero as shown in Graph C of FIG. 2.

Figure 3:
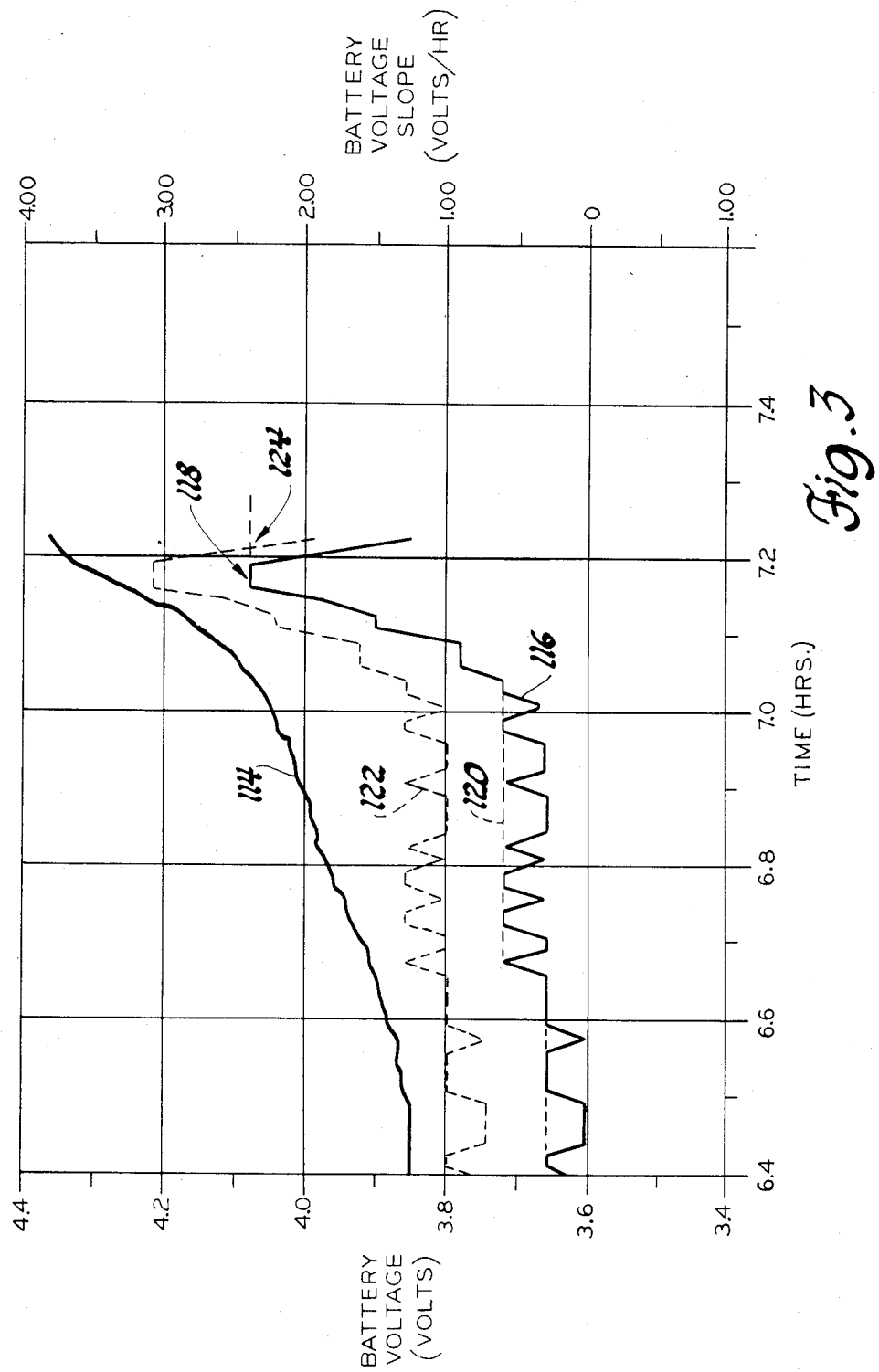
FIG. 3 depicts various battery voltage related waveforms recorded and derived during an actual charging cycle of a 2-cell nickel-zinc battery.

Following the execution of flow diagram portion 66, the flow diagram portion 68 is executed to determine when the battery voltage slope reaches its maximum value and then to terminate the battery charging cycle. However, the battery voltage waveform in actual practice is not nearly as smooth as depicted in the idealized waveform in Graph A of FIG. 2, but is rather somewhat undulating as shown by the trace 114 in FIG. 3, which trace was recorded during an actual battery charging cycle. The solid trace 116 in FIG. 3 is derived from the trace 114 and represents the slope or first derivative of battery voltage with respect to time. The maximum slope value, designated generally by the reference numeral 118 in the trace 116, is determined according to this invention by continuously identifying and storing the maximum slope recorded during the charging cycle, and by terminating the charging cycle when the most recently determined slope value falls below such maximum slope value by more than a predetermined amount. The maximum slope for the battery charging cycle depicted in FIG. 3, is represented by the broken trace 120 which is partially superimposed on the slope trace 116. The predetermined amount by which the most recently determined slope value must fall below the maximum slope value before terminating the charging cycle is chosen such that the normally occurring battery slope fluctuations do not result in premature termination of the battery charging cycle. Such predetermined amount should be set relatively low so that the charge cycle is terminated as near as possible to the slope inflection point, but high enough to prevent premature termination of the charging cycle. In this regard, we have found that for a battery containing two or more cells, the predetermined amount, hereinafter referred to as the offset amount, should be approximately 0.30 volts-per-hour-per-cell to yield the optimum performance. To implement the above algorithm on a microcomputer based system such as shown in FIG. 1, the maximum slope during the charging cycle (SLOPE MAX) is compared with the sum of the most recently determined slope value, SLOPE (X), and the offset amount. Such sum is depicted by the broken trace 122 in FIG. 3, and the charging cycle is terminated at the point generally designated by reference numeral 124 when the sum is equal to or less than the maximum slope value desiganted by the broken trace 120.

Flow diagram portion 68 implements the above described algorithm for identifying the maximum battery voltage slope value and for terminating the charging cycle. Instruction block 130 determines if the sum of the most recently determined slope value, SLOPE (X) and the offset amount, k, is less than the maximum slope value, SLOPE MAX. If so, instruction block 132 is executed to terminate the battery charging cycle by biasing power transistor 34 to its nonconductive state. If not, a series of program instructions, designated generally by the reference numeral 134, are executed as a backup or precautionary measure to determine if termination of the charging cycle is appropriate. Instruction block 136 determines if the most recently determined battery voltage reading—$V_b(2)$—is greater than a reference amount, REF (1), associated with a medium battery state of charge such as 1.94 volts-per-cell. If so, it is then determined at instruction block 138 whether the most recently determined slope value, SLOPE (X), is less than a reference value, REF (2), corresponding to a relatively low slope, such as 0.02 volts-per-hour-per-cell. If so, instruction block 132 is executed to terminate the battery charging cycle. Thus, the battery charging cycle may be independently terminated if the battery voltage exceeds REF (1) and if the battery voltage slope is less than REF (2). The concurrent occurrence of such conditions would indicate that the maximum battery voltage slope is occurring or has just occurred. If the most recently determined battery voltage is less than or equal to REF (1) or if the most recently determined slope value is greater than or equal to REF (2), termination of the battery charging cycle is not appropriate and instruction block 140 is executed to update the battery voltage readings. Thus, instruction block 140 serves to discard the oldest battery voltage reading $V_b(0)$ and to substitute for it the value of the more recent battery voltage reading $V_b(1)$, and the variable $V_b(1)$ is set equal to the most recent battery voltage reading $V_b(2)$. At this point, the flow diagram portion 62 is re-executed to take a new voltage reading $V_b(2)$ and to calculate a new slope SLOPE (X). When instruction block 100 of flow diagram portion 64 is executed, the SLOPE FLAG will have been set and execution of the remainder of the flow diagram portion 64 is skipped as indicated by flow diagram line 142. Flow diagram portions 66 and 68 are then executed to update the value SLOPE MAX if necessary, and to determine if the charging cycle should be terminated. Once instruction block 132 is executed to terminate the battery charging cycle, further execution of the flow diagram is terminated and an indication that the battery charging cycle is finished may be provided to inform the operator.

As indicated earlier, the battery charging system of this invention has been developed for charging a nickel-zinc battery such as might be used to power the traction motor of an electric vehicle. Of course, the principles set forth herein are applicable to any nickel-zinc or like battery charging application and will accord the same benefit of improved battery life. Our testing of the battery charging method of this invention has shown it to be a useful method regardless of the battery age, temperature or state of charge. Although battery age and temperature affect the battery voltage waveform that occurs during a charging cycle, the characteristic S-shape curve persists and the battery charging system of this invention remains effective to identify the maximum battery voltage slope value and to terminate the battery charging cycle at such time.

Although this invention has been described in reference to a specific embodiment, it will be understood that various modifications thereto may occur to one skilled in the art. For example, the charging method of this invention may be implemented with a system which develops a signal (as in Graph C of FIG. 2) corresponding to the second derivative with respect to time of the charging voltage and which terminates charging when such signal changes from positive to negative. Such systems are intended to fall within the scope of this invention, which is defined by the appended claims.

The embodiments of the invention in which an exclusive property or privilege is claimed are defined as follows:

1. A method of charging a nickel-zinc battery, comprising:
   supplying the battery with charging current such that the battery exhibits a charging voltage which increases over time toward a maximum and such that the slope of the charging voltage increases and then decreases as the charging voltage approaches the maximum;
   measuring the battery voltage magnitude at predetermined intervals during the entire course of the charging process, and after the occurrence of at least three such intervals determining a slope value at each subsequent interval according to the difference between the most recently measured voltage magnitude and a voltage magnitude measured at least two intervals prior thereto; and
   terminating the supply of charging current in substantial relation to the inflection point at which the measured slope values change from increasing to decreasing to thereby improve battery life.

2. A method of charging a nickel-zinc battery, comprising:
   supplying the battery charging current such that the battery exhibits a generally S-shaped voltage waveform which increases over time toward a maximum and such that the slope of the voltage waveform increases and then decreases as the charging voltage approaches the maximum;
   measuring the battery voltage magnitude at predetermined intervals during the entire course of the charging process and after the occurrence of at least three such intervals determining a slope value at each subsequent interval according to the difference between the most recently measured voltage magnitude and a voltage magnitude measured at least two intervals prior thereto; and
   after at least two successive increases in the determined slope value, comparing the most recently determined slope value with previously determined slope values to identify the highest slope value and terminating the supply of charging current when the most recently determined slope value is less than the highest slope value by a least a predetermined amount so as to terminate the charging process in substantial relation to the point at which the slope of the voltage waveform changes from increasing to decreasing thereby improving battery life.

3. Apparatus for charging a nickel-zinc battery, comprising:
   means for supplying the battery with charging current such that the battery exhibits a generally S-shaped voltage waveform which increases over time toward a maximum and such that the slope of the voltage waveform increases and then decreases as the charging voltage approaches the maximum;
   means for periodically measuring the battery voltage magnitude at predetermined intervals during the entire course of the battery charging process and effective after the occurrence of at least three of such intervals for determining the slope value at each subsequent internal according the difference between the most recently measured voltage magnitude and a voltage magnitude measured at least two intervals prior thereto; and
   means effective after such periodically determined slope values have increased at least twice in succession for comparing the most recently determined slope value with the highest determined slope value and for terminating the supply of charging current when the most recently determined slope value falls below the highest determined slope value by at least a predetermined amount so as to terminate the charging process in substantial relation to the point at which the slope of the voltage waveform changes from increasing to decreasing therby improving battery life.

* * * * *